April 16, 1974
M. J. BLOCK
3,804,943
METHOD OF REMOVING UNSATURATED OR
AROMATIC HYDROCARBONS FROM GASES
Filed Nov. 15, 1971
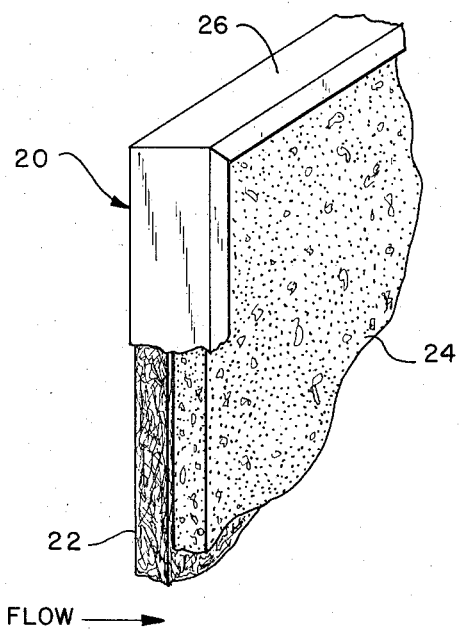
FLOW ⟶
INVENTOR.
MYRON J. BLOCK
BY *Schiller & Pandiscio*
ATTORNEYS United States Patent Office  3,804,943
Patented Apr. 16, 1974

3,804,943
METHOD OF REMOVING UNSATURATED OR AROMATIC HYDROCARBONS FROM GASES
Myron J. Block, 4 Cliff St., Nahant, Mass. 01908
Continuation-in-part of abandoned application Ser. No. 156,296, June 24, 1971. This application Nov. 15, 1971, Ser. No. 198,774
Int. Cl. B01d 35/16, 53/34
U.S. Cl. 423—245                       6 Claims

ABSTRACT OF THE DISCLOSURE

A gas filter, particularly adapted for engine exhausts or for air-conditioning intakes in which there is a first gas-porous bat of fibers to effect mechanical filtering of particulate matter, and a second gas-porous bat of fibers, strips, powder or the like formed from a polymer of a perhalogenated sulfonated alkene such as perfluoroethylene sulfonic acid to effect removal by reaction with unsaturated and aromatic hydrocarbons in the effluent from the mechanical filter.

---

This application is a continuation-in-part of copending patent application Ser. No. 156,296, filed June 24, 1971, and now abandoned.

This invention is concerned with filtering of gases and vapors, and more particularly to filtering of hydrocarbons from the ambient atmosphere.

It is known that atmospheric pollutants include a large number of materials that have a hydrocarbon structure. The term "hydrocarbon" as used herein is intended to include compounds that consist soley of carbon and hydrogen, and such compounds which are incompletely substituted, at least to the extent that one or more C-H moieties or parts remain in the molecule. Many of such atmospheric hydrocarbon pollutants are the pyrolytic products of partially burned gasoline, and also residual unburned gasoline. Of the pyrolytic residues, the major components are largely vaporous unsaturated hydrocarbons and also aromatic hydrocarbons. The presence of these compounds in the atmosphere, particularly in large quantities as in the major cities is a source of considerable annoyance and, in fact may constitute a serious health hazard.

Being vaporous (which term as used herein is intended to include hydrocarbons in gaseous form as well as liquid-gas aerosols in which the hydrocarbon forms either or both phases) it has hitherto been virtually impossible to exclude the hydrocarbons from the atmosphere inside of dwellings and other structures, from the intake of air compressors, or other places where the presence of these pollutants is unwanted. One system in use is to scrub the intake gas with a water bath to entrap the undesired gases, but this tends to introduce unwanted moisture in many cases. Another system is to scrub the intake gas with an organic solvent or oil which will absorb the hydrocarbon gases. However, even if such an oil has an extremely low vapor pressure, it nevertheless will tend to come to equilibrium quickly with the atmosphere and will then reemit the dissolved hydrocarbons to the same extent it absorbs them. Basic chemicals and activated charcoal gas baffles or traps are not very selective and tend to saturate very quickly because of the presence of $CO_2$ and other acid gases in the atmosphere.

A principal object of the present invention is therefore to provide a system for filtering or removing such vaporous unsaturated and aromatic hydrocarbons from a gas stream. Another object of the present invention is to provide such a system which employs a material which is a specific absorber for unsaturated and aromatic hydrocarbon vapors. Yet another object of the present invention is to provide a mechanically passive filter for filtering out such hydrocarbons from a gas stream, which filter is simple to make, use and install.

To effect the foregoing and other objects of the present invention, there is generally provided a filter element formed of a gas-porous mass of a perhalogenated alkene-based polymer containing pendant sulfonyl groups. This element can be used alone, but is preferably employed by being disposed behind or in the effluent gas stream from a second filter element. The latter is typical of the prior art and is formed of a gas-porous mass which is intended simply to serve to remove, from an air stream passing therethrough, the majority of particulate matter, particularly all of the large particles, e.g. those of 100 microns or more in diameter.

Other objects of the invention will in part be obvious and will in part appear hereinafter. The invention accordingly comprises the apparatus possessing the construction, combination of elements and arrangement of parts and the method comprising the several steps and order and relation thereof, all of which are exemplified in the following detailed disclosure, and the scope of the application of which will be indicated in the claims.

For a fuller understanding of the nature and objects of the invention, reference should be had to the following detailed description taken in connection with the accompanying drawing wherein there is shown a perspective fragmentary view, of a filter embodying the principles of the present invention.

Referring now to the drawing there will be seen a filter system designated generally at 20 including a first filter element such as bat 22 of fibers arranged typically in random fashion to provide a porous structure through which a gas stream can be passed under a reasonably small head of pressure, as may be provided by the air intake of an air-conditioning system or the like. The fibers of bat 22 typically are made of a relatively chemically inert material such as glass or a polymer such as ethyl cellulose, polyvinyl acetate and a host of other materials that can be spun or formed into the fine fibers capable of forming a bat which can function to entrap particulate matter.

Disposed adjacent bat 22 in the path of effluent gas from the latter, is a second filter element 24 formed as a gas-porous structure from a polymer of a perhalogenated sulfonated alkene-based polymer.

The latter material is a homogeneous polymer made as a fluorosulfonyl derivative having a generalized formula (1)
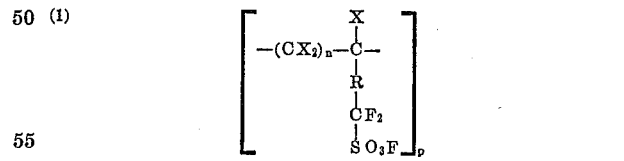

where X is a halogen, $n$ and $p$ are integers, and R is a moisty selected from the groups [—O—$(CF_2)_m$—], [—R′—$(CF_2)_m$—] and [—$(CF_2)_m$—] wherein the terminal —$CF_2$— radical of those groups is bonded to the $CF_2$ radical connected to the sulfonyl group, $m$ is an integer from 1 to 6, R′ is a perhalogenated alkyl biradical teger from 1 to 6 carbon atoms. This material is usually hydrolyzed to the sulfonic acid form described as (2)
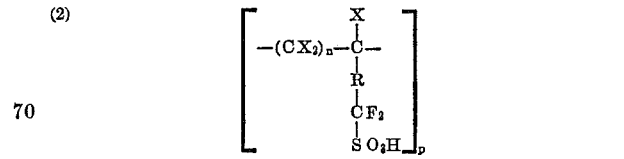

The two compounds described above (1) and (2) are highly reactive and react with appropriate unsaturated or aromatic hydrocarbons covalently.

Both of the compounds or derivatives are structures of a completely halogenated polymer that essentially has a polyperhaloalkene based type of backbone with sulfonyl derivative (i.e. —SO$_2$—) ended side chains and substantially lacks any hydrocarbon groups. The presence of O or R' in the molecule does not materially affect the reactivity or use of the material for purposes of the invention, nor if $m>1$ is the reactivity materially affected The molecular weight of the material is not particularly important inasmuch as the desired reactivity with the particular hydrocarbon gases is due to the presence of the fluorsulfonyl groups. In this regard, the number of sulfonyl groups can be varied as can the number of CF$_2$ groups. The halogen substitutions on the backbone can be either fluorine, chlorine or other halogens in mixed proportions, but the backbone should be perhalogenated to insure that substantially no hydrogens remain bonded to the molecule. Typically then, the molecular backbone if perfluorinated, is similar to the polytetrafluoroethylene type of backbone; and if partially chlorinated then similar to the backbone of Kel-F (a trademark of the 3M Company) i.e. a chloro 3-fluoroethylene polymer with fluorsulfonyl side chains. Thus, the polymeric material can vary fairly widely in molecular weight, retention capacity, and electrical and mechanical characteristics. However, where the polymer is preferably substantially completely halogenated and possesses fluorsulfonyl side chains, it will provide the properties required for purposes of the invention. Generally, it is preferred to use polymers of the lowest equivalent weight provided that the weight is not so low that the polymer becomes unstable at room temperature. This serves to increase the ratio of sulfonyl groups to carbon atoms and thus increase the retention capacity.

Polymers of this type are described more fully in U.S. Pat. No. 3,282,875, and an exemplary film thereof is available from E. I. du Pont de Nemours & Co., Inc., Wilmington, Del., under the trade designation "XR Perfluor-Sulfonic Acid Membranes."

As a characteristic of this type of polymeric structure (herein called perhaloalkene sulfonyl polymers), hydrocarbon vapors, both unsaturates and aromatics, tend to diffuse readily into the polymer. The polymeric material has an upper use temperature, typically around 225° C. for the above-identified film depending on the equivalent weight of the membrane (usually up to about 1300 equivalent weight range), the environment employed and the desired service life.

This perhaloalkene sulfonyl material, such as polytetrafluorethylene sulfonic acid, will readily act to scrub a gas stream passing therethrough, to remove vapors of certain hydrocarbons which contain one or more multiple carbon-to-carbon bond, and one or more CH$_t$ moiety (where $t$ is an integer from 1 to 3). These latter hydrocarbons may be typified generally as the aromatic hydrocarbons and the unsaturated hydrocarbons. Typically, the perfluorsulfonic acid type material will react with the vapors of such aromatics as benzene, xylene, anthracene, naphthalene, carbazole and even mixtures such as ligroin or petroleum ether. The membrane will also react with the vapors of unsaturates such as the alkenes, conjugated dienes, alkynes and the like.

The reaction with these particular hydrocarbon vapors is believed due to a sulfonation reaction in which the hydrocarbon vapor molecule R'' is attached at the fluorsulfonyl (—CF$_2$·SO$_2$—) sites to form a sulfone derivative wherein the terminal group then becomes

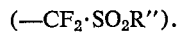
(—CF$_2$·SO$_2$R'').

The requisite polymer is in comminuted form. For example, in one embodiment the polymer is formed of a plurality of thin sheets or strips, e.g. 1 or 2 mils thick in substantially parallel relation, spaced from one another to permit passage of gas between them. Alternatively, element 24 can be formed of a porous mass of loose powder packed in a container, or a porous sheet of lightly sintered powder, or as a mass of fibers formed as by shredding or slitting sheet material.

The term "comminuted" is also intended to cover other structures as well, in which similar interstitial spaces exist between small bodies of polymer to permit relatively free passage of an air stream over the polymer surface and through one body, and also provides a relatively high surface-to-volume ratio. While it is appreciated that the polymer itself is quite gas permeable, it is desirable to provide a gas-porous structure which will not provide excessive mechanical impedance to air flow and will tend to insure that the desired reactions will occur even during very short transit time for gas passing through the filter.

As is shown in the drawing, the filter system is formed so that the perhaloalkene sulfonyl polymer filter element 24 is downstream from bat 22 with respect to the expected direction of air flow as shown by the arrow. Bat 22 serves to remove particulate irritants from the air flow, prefiltering reduces the probability that element 24 will become clogged. One can expect that bat 22 will be considerably less expensive and thus more readily disposable than element 24.

Bats 22 and filter element 24 are typically held in the desired relationship to one another by frame 26, which can be quite conventional. The frame can be designed to fit whatever device or structure with which the filter is to be used. For example, the frame can be a large rectangular form designed to fit in air-conditioning units or can be a small circular shape intended to fit into exhausts from internal combustion engines. In the latter case, the filter function is to directly remedy the pollution effect of the engine exhaust rather than to attack the problem after the ambient air has been polluted.

The amount of a particular hydrocarbon that can be removed depends upon the equivalent weights of the polymer forming filter element 24 and the molecular weight of the hydrocarbon. By way of example, a filter having a kilogram of the requisite polymeric materail should scrub at saturation about 12,000,000 cubic feet of air containing an equivalent in benzene of 0.5 p.p.m.

Since certain changes may be made in the above apparatus and method without departing from the scope of the invention herein involved, it is intended that all matter contained in the above description or shown in the accompanying drawing shall be interpreted in an illustrative and not in a limiting sense.

What is claimed is:

1. Method of filtering a gas stream containing a quantity of unsaturated or aromatic hydrocarbons in vaporous form comprising the step of contacting said gas stream with a surface of a completely halogenated alkene-based polymer having pendant active fluorsulfonyl groups, to induce chemical reaction between said polymer and the vapors of said unsaturated and aromatic hydrocarbons.

2. Method as defined in claim 1 including the step of prefiltering said gas stream to reduce the amount of particulate matter therein prior to passage over said polymer surface.

3. A method as defined in claim 1 wherein said polymer has the generalized formula

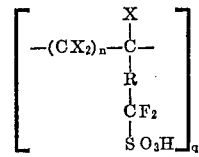

where X is a halogen, $n$ and $p$ are integers, and R is a moiety selected from the group consisting of the radicals [—O—(CF$_2$)$_m$—], [—R'—(CF$_2$)$_m$—] and

[—(CF$_2$)$_m$—]

wherein the terminal —CF$_2$— portion of said radicals is bonded to the CF$_2$ portion connected to the fluorosulfonyl group, m is an integer, and R' is a perhalogenated alkyl biradical having from 1 to 6 carbon atoms.

4. A method as defined in claim 3 wherein X is fluorine.

5. A method as defined in claim 1 wherein said polymer has the generalized formula

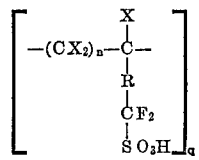

where X is a halogen, n and p are integers, and R is a moiety selected from the group consisting of the radicals [—O—(CF$_2$)$_m$—], [—R'—(CF$_2$)$_m$—] and

[—(CF$_2$)$_m$—]

wherein the terminal —CF$_2$— portion of said radicals is bonded to the CF$_2$ portion connected to the fluorsulfonyl group, m is an integer and R' is a perhalogenated alkyl biradical having from one to six carbon atoms.

6. A method as defined in claim 5 wherein X is fluorine.

References Cited
UNITED STATES PATENTS

| | | | |
|---|---|---|---|
| 2,430,861 | 11/1947 | Carpenter et al. | 423—230 |
| 2,664,340 | 12/1953 | Houdry | 423—213 |
| 3,019,854 | 2/1962 | O'Bryant | 55—Dig. 16 |
| 3,282,875 | 11/1966 | Connolly et al. | 260—87.5 R |

EARL C. THOMAS, Primary Examiner

U.S. Cl. X.R.

55—Dig. 16; 423—212

PO-1050
(5/69)

UNITED STATES PATENT OFFICE
CERTIFICATE OF CORRECTION

Patent No. 3,804,943  Dated April 16, 1974

Inventor(s) MYRON J. BLOCK

It is certified that error appears in the above-identified patent and that said Letters Patent are hereby corrected as shown below:

IN THE SPECIFICATION:

Column 2, line 55, delete $SO_3F$ and substitute therefor --$SO_2F$.

IN THE CLAIMS:

Column 4, line 70 the formula should be corrected as follows:

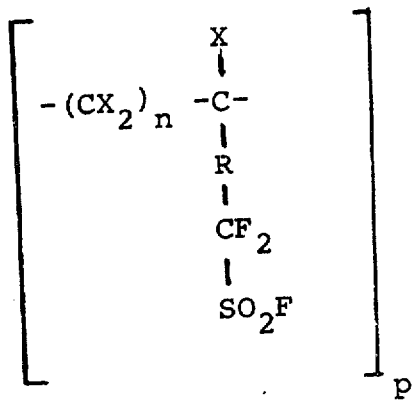

UNITED STATES PATENT OFFICE
CERTIFICATE OF CORRECTION

Patent No. 3,804,943  Dated April 16, 1974

Inventor(s) MYRON J. BLOCK

PAGE - 2

It is certified that error appears in the above-identified patent and that said Letters Patent are hereby corrected as shown below:

Column 5, line 15, the formula should be corredted as follows:

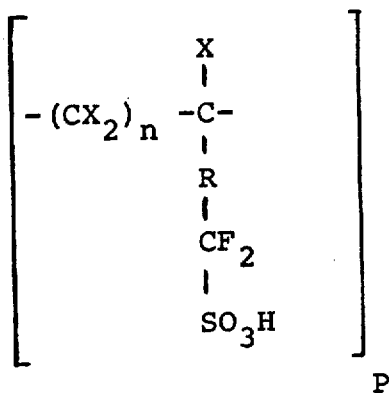

Signed and sealed this 1st day of October 1974.

(SEAL)
Attest:

McCOY M. GIBSON JR.
Attesting Officer

C. MARSHALL DANN
Commissioner of Patents